(12) United States Patent
Andersson et al.

(10) Patent No.: US 10,701,361 B2
(45) Date of Patent: Jun. 30, 2020

(54) ENCODING OF PICTURES IN A VIDEO

(71) Applicant: Telefonaktiebolaget LM Ericsson (publ), Stockholm (SE)

(72) Inventors: Kenneth Andersson, Gävle (SE); Per Hermansson, Årsta (SE); Martin Pettersson, Vallentuna (SE); Jonatan Samuelsson, Enskede (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/777,815

(22) PCT Filed: Nov. 28, 2016

(86) PCT No.: PCT/EP2016/079009
§ 371 (c)(1),
(2) Date: May 21, 2018

(87) PCT Pub. No.: WO2017/093189
PCT Pub. Date: Jun. 8, 2017

(65) Prior Publication Data
US 2018/0376143 A1 Dec. 27, 2018

Related U.S. Application Data

(60) Provisional application No. 62/260,765, filed on Nov. 30, 2015.

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/136* (2014.11); *H04N 19/172* (2014.11);
(Continued)

(58) Field of Classification Search
CPC .. H04N 19/124; H04N 19/126; H04N 19/136; H04N 19/172; H04N 19/176; H04N 19/196; H04N 19/46
(Continued)

(56) References Cited

U.S. PATENT DOCUMENTS

2007/0058714 A1  3/2007 Noda
2017/0214914 A1* 7/2017 Sato ..................... H04N 19/176

OTHER PUBLICATIONS

International Search Report and Written Opinion dated Feb. 9, 2017 issued in International Application No. PCT/EP2016/079009. (10 pages).

(Continued)

*Primary Examiner* — Dominic D Saltarelli
(74) *Attorney, Agent, or Firm* — Sage Patent Group

(57) ABSTRACT

There are provided mechanisms for encoding a picture of a video sequence in a video bitstream. The picture comprises a first block of samples, wherein each sample in the first block of samples has sample values associated with at least a luma color component and a chroma color component. Each color component is assigned a first quantization parameter. The method comprises calculating a quantization parameter change for at least one color component in the first block of samples, with respect to the first quantization parameter, based on statistics calculated from the sample values from at least one color component in a second block of samples. The second block of samples is one of: source samples of the first block of samples and source samples larger than the first block of samples including the first block of samples. The method comprises quantizing at least one transform coefficient of a residual for the at least one color component in the first block of samples with a second quantization parameter, wherein the second quantization parameter is equal to the sum of the first quantization parameter and the quantization parameter change for the at
(Continued)

least one color component. The method comprises signaling the quantization parameter change for the at least one color component to a decoder.

18 Claims, 2 Drawing Sheets

(51) Int. Cl.
*H04N 19/136* (2014.01)
*H04N 19/46* (2014.01)
*H04N 19/172* (2014.01)
*H04N 19/196* (2014.01)
*H04N 19/18* (2014.01)
*H04N 19/186* (2014.01)

(52) U.S. Cl.
CPC ......... *H04N 19/176* (2014.11); *H04N 19/196* (2014.11); *H04N 19/46* (2014.11); *H04N 19/18* (2014.11); *H04N 19/186* (2014.11); *H04N 19/198* (2014.11)

(58) Field of Classification Search
USPC .................................................... 375/240.08
See application file for complete search history.

(56) References Cited

OTHER PUBLICATIONS

Zhao, J. et al., "Performance investigation of high dynamic range and wide color gamut video coding techniques", Sharp Labs of America; International Organisation For Standardisation Organisation Internationale de Normalisation, ISO/IEC JTC1/SC29/WG11; MPEG2015/M37439; Oct. 16, 2015; XP030065807. (27 pages).

He, Y. et al., "Encoder optimization for HDR WCG coding", InterDigital Communications, LLC; International Organisation For Standardisation Organisation Internationale de Normalisation, ISO/IEC JTC1/SC29/WG11; M37223; Oct. 15, 2015; XP030065591. (6 pages).

Prangnell, Lee et al., "Adaptive Quantization by Soft Thresholding in HEVC", 2015 Picture Coding Symposium (PCS), IEEE, May 31, 2015, XP032951329. (5 pages).

\* cited by examiner

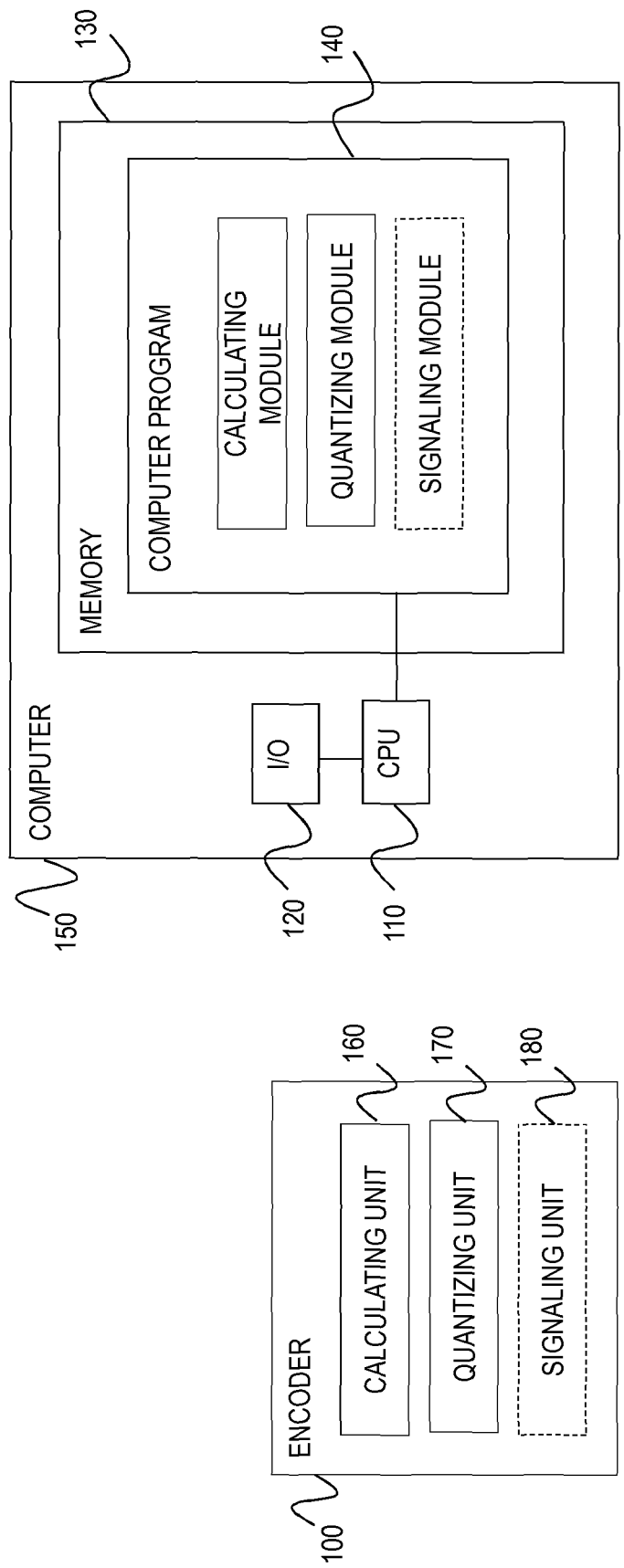

ENCODING OF PICTURES IN A VIDEO

CROSS REFERENCE TO RELATED APPLICATION(S)

This application is a 35 U.S.C. § 371 National Stage of International Patent Application No. PCT/EP2016/079009, filed Nov. 28, 2016, designating the United States and claiming priority to U.S. provisional application No. 62/260,765, filed on Nov. 30, 2015. The above identified applications are incorporated by reference.

TECHNICAL FIELD

Embodiments herein relate to the field of video coding, such as High Efficiency Video Coding (HEVC) or the like. In particular, embodiments herein relate to a method and an encoder for encoding a picture of a video sequence in a video bitstream. Corresponding computer program therefor is also disclosed.

BACKGROUND

High Dynamic Range (HDR) with Wide Color Gamut (WCG) has become an increasingly hot topic within the TV and multimedia industry in the last couple of years. While screens capable of displaying the HDR video signal are emerging at the consumer market, over-the-top (OTT) players such as Netflix have announced that HDR content will be delivered to the end-user. Standardization bodies are working on specifying the requirements for HDR. For instance, in the roadmap for DVB, UHDTV1 phase 2 will include HDR support. MPEG is currently working on exploring how HDR video could be compressed.

HDR imaging is a set of techniques within photography that allows for a greater dynamic range of luminosity compared to standard digital imaging. Dynamic range in digital cameras is typically measured in f-stops, where one f-stop means doubling of the amount of light. A standard LCD HDTV using Standard Dynamic Range (SDR) can display less than or equal to 10 stops. HDR is defined by MPEG to have a dynamic range of over 16 f-stops. WCG is to increase the color fidelity from ITU-R BT.709 towards ITU-R BT.2020 such that more of the visible colors can be captured and displayed.

HDR is defined for UHDTV in ITU-R Recommendation BT.2020 while SDR is defined for HDTV in ITU-R Recommendation BT.709.

A color model is a mathematical model that defines the possible colors that can be presented using a predefined number of components. Examples of color models are RGB, Y'CbCr 4:2:0 (also called YUV 4:2:0), CIE1931 etc.

A picture element (pixel for short) is the smallest element of a digital image and holds the luminance and color information of that element. The luminance and color can be expressed in different ways depending on the use case. Displays usually have three color elements, red, green and blue which are lit at different intensities depending on what color and luminance is to be displayed. It becomes therefore convenient to send the pixel information in RGB pixel format to the display. Since the signal is digital the intensity of each component of the pixel must be represented with a fixed number of bits, referred to as the bit depth of the component. A bit depth of n can represent $2^n$ different values, e.g. 256 values per component for 8 bits and 1024 values per component for 10 bits.

When video needs to be compressed it is convenient to express the luminance and color information of the pixel with one luminance component and two color components. This is done since the human visual system (HVS) is more sensitive to luminance than to color, meaning that luminance can be represented with higher accuracy than color. One commonly used format that allows for this separation is Y'CbCr 4:2:0 (also called YUV 4:2:0) where the Cb- and Cr-components have quarter resolution compared to the Y' components. When encoding video, the non-linear gamma transfer function is typically applied to the linear RGB samples to obtain the non-linear R'G'B' representation, and then a 3×3 matrix multiplication is applied to get to Y'CbCr. The resulting Y component is referred to as luma which is roughly equal to luminance. The true luminance is instead obtained by converting the linear RGB samples using a 3×3 matrix operation to get to XYZ in the CIE1931 color space. The luminance is the Y coordinate of this XYZ-vector. Sometimes one can refer to a function of the Y coordinate as luminance, for instance when a transfer function has been applied to Y. Likewise, the Cb and Cr components of Y'CbCr 4:2:0 together are called chroma, which is similar to but different from chrominance. To get the chrominance, the X and Z coordinates of the CIE 1931 are used. One chrominance representation is the coordinates (x,y) where $x=X/(X+Y+Z)$ and $y=Y/(X+Y+Z)$. Y'CbCr is not the only representation that attempts to separate luminance from chrominance, there also exist other formats such as YdZdx which is based on XYZ etc. However, Y'CbCr is the most commonly used representation. Before displaying samples, the chroma components are first upsampled to 4:4:4, e.g., the same resolution as the luma, and then the luma and chroma are converted to R'G'B' and then converted to the linear domain before being displayed.

High Efficiency Video Coding (HEVC) is a block based video codec standardized by ITU-T and MPEG that utilizes both temporal and spatial prediction. Spatial prediction is achieved using intra (I) prediction within the current frame. Temporal prediction is achieved using inter (P) or bi-directional inter (B) prediction on block level from previously decoded reference pictures. The difference between the original pixel data and the predicted pixel data, referred to as a residual, is transformed into the frequency domain and quantized before being entropy coded and transmitted together with necessary prediction parameters such as mode selections and motion vectors. By quantizing the transformed residuals, the tradeoff between bitrate and quality of the video may be controlled.

The level of quantization is determined by the quantization parameter (QP). The quantization parameter (QP) is a key technique to control the qualitylbitrate of the residual in video coding. It is applied such that it controls the fidelity of the residual (typically transform coefficients) and thus also controls the amount of coding artifacts. When QP is high the transform coefficients are quantized coarsely resulting in fewer bits but also possibly more coding artifacts than when QP is small where the transform coefficients are quantized finely. A low QP thus generally results in high quality and a high QP results in low quality. In HEVC v1 (similarly also for H.264/AVC) the quantization parameter can be controlled on picture, slice, or block level. On picture and slice level it can be controlled individualy for each color component In HEVC v2 the quantization parameter for chroma can be individually controlled for the chroma components on a block level.

It is known from state of the art that the QP can be controlled based on the local luma level such that a finer quantization, e.g., a lower QP, is used for blocks with high local luma levels/small variations in local luma levels than for blocks with low local luma levels/large variations in local luma levels. The reason is that it is better to spend bits in smooth areas where errors are more visible than in highly textured areas where errors are masked. Similarly, it is easier to spot errors at high luminance levels than in low luminance levels, and since luma is often a good predictor for luminance, this works.

HEVC uses by default a uniform reconstruction quantization (URQ) scheme that quantizes frequencies equally. HEVC has the option of using quantization scaling matrices (also referred to as scaling lists), either default ones, or quantization scaling matrices that are signaled as scaling list data in the SPS or PPS. To reduce the memory needed for storage, scaling matrices may only be specified for 4×4 and 8×8 matrices. For the larger transformations of sizes 16×16 and 32×32 the signaled 8×8 matrix is applied by having 2×2 and 4×4 blocks share the same scaling value, except at the DC positions.

A scaling matrix, with individual scaling factors for respective transform coefficient, can be used to make a different quantization effect for respective transform coefficient by scaling the transform coefficients individually with respective scaling factor as part of the quantization. This enables for example that the quantization effect is stronger for higher frequency transform coefficients than for lower frequency transform coefficients. In HEVC default scaling matrices are defined for each transform size and can be invoked by flags in the Sequence Parameter Set (SPS) and/or the Picture Parameter Set (PPS). Scaling matrices also exist in H.264. In HEVC it is also possible to define own scaling matrices in SPS or PPS specifically for each combination of color component, transform size and prediction type (intra or inter mode).

SUMMARY

The problem with current solutions is that they do not exploit the amount of flexibility provided by a video coding standard to address changes/adaptations of the coding with respect to statistical characteristics of source content With the introduction of High Dynamic Range content, more variation of sample values is present than for Standard Dynamic Range content.

The basic idea of at least one embodiment of the present invention is to exploit the flexibility available by a video coding standard to perform encoding, to be able to address a larger range of variations that exist in High Dynamic Range content. However, this could also be beneficial for encoding of Standard Dynamic Range content.

This and other objectives are met by embodiments as disclosed herein.

A first aspect of the embodiments defines a method for encoding a picture of a video sequence in a video bitstream. The picture comprises a first block of samples, wherein each sample in the first block of samples has sample values associated with at least a luma color component and a chroma color component Each color component is assigned a first quantization parameter. The method comprises calculating a quantization parameter change for at least one color component in the first block of samples, with respect to the first quantization parameter, based on statistics calculated from the sample values from at least one color component in a second block of samples. The second block of samples is one of: source samples of the first block of samples and source samples larger than the first block of samples including the first block of samples. The method comprises quantizing at least one transform coefficient of a residual for the at least one color component in the first block of samples with a second quantization parameter, wherein the second quantization parameter is equal to the sum of the first quantization parameter and the quantization parameter change for the at least one color component. The method comprises signaling the quantization parameter change for the at least one color component in the first block of samples to a decoder.

A second aspect of the embodiments defines an encoder for encoding a picture of a video sequence in a video bitstream. The picture comprises a first block of samples, wherein each sample in the first block of samples has sample values associated with at least a luma color component and a chroma color component. Each color component is assigned a first quantization parameter. The encoder comprises processing means operative to calculate a quantization parameter change for at least one color component in the first block of samples, with respect to the first quantization parameter, based on statistics calculated from the sample values from at least one color component in a second block of samples. The second block of samples is one of: source samples of the first block of samples and source samples larger than the first block of samples including the first block of samples. The encoder comprises processing means operative to quantize at least one transform coefficient of a residual for the at least one color component in the first block of samples with a second quantization parameter, wherein the second quantization parameter is equal to the sum of the first quantization parameter and the quantization parameter change for the at least one color component. The encoder comprises processing means operative to signal the quantization parameter change for the at least one color component in the first block of samples to a decoder.

A third aspect of the embodiments defines a computer program for encoding a picture of a video sequence in a video bitstream. The picture comprises a first block of samples, wherein each sample in the first block of samples has sample values associated with at least a luma color component and a chroma color component. Each color component is assigned a first quantization parameter. The computer program comprises code means which, when run on a computer, causes the computer to calculate a quantization parameter change for at least one color component in the first block of samples, with respect to the first quantization parameter, based on statistics calculated from the sample values from at least one color component in a second block of samples. The second block of samples is one of: source samples of the first block of samples and source samples larger than the first block of samples including the first block of samples. The computer program comprises code means which, when run on a computer, causes the computer to quantize at least one transform coefficient of a residual for the at least one color component in the first block of samples with a second quantization parameter, wherein the second quantization parameter is equal to the sum of the first quantization parameter and the quantization parameter change for the at least one color component. The computer program comprises code means which, when run on a computer, causes the computer to signal the quantization parameter change for the at least one color component in the first block of samples to a decoder.

A fourth aspect of the embodiments defines a computer program product comprising computer readable means and a computer program, according to the third aspect, stored on the computer readable means.

Advantageously, at least some of the embodiments provide higher compression efficiency.

It is to be noted that any feature of the first, second, third and fourth aspects may be applied to any other aspect, whenever appropriate. Likewise, any advantage of the first aspect may equally apply to the second, third and fourth aspects respectively, and vice versa. Other objectives, features and advantages of the enclosed embodiments will be apparent from the following detailed disclosure, from the attached dependent claims and from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention, together with further objects and advantages thereof, may best be understood by making reference to the following description taken together with the accompanying drawings, in which:

FIG. 3 depicts a schematic block diagram illustrating functional units of an encoder for encoding a picture of a video sequence according to embodiments of the present invention.

FIG. 4 illustrates an encoder sending a quantization parameter change for the at least the first block of samples to a decoder, according to embodiments of the present invention.

FIG. 5 illustrates a schematic block diagram illustrating a computer comprising a computer program product with a computer program for encoding a picture of a video sequence, according to embodiments of the present invention.

DETAILED DESCRIPTION

The accompanying drawings, which are incorporated herein and form part of the specification, illustrate various embodiments of the present invention and, together with the description, further serve to explain the principles of the invention and to enable a person skilled in the art to make and use the invention. Throughout the drawings, the same reference numbers are used for similar or corresponding elements.

Throughout the description, the terms "video", "video sequence", "input video" and "source video" are interchangeably used.

Even though the description of the invention is based on the HEVC codec, it is to be understood by a person skilled in the art that the invention could be applied to any other state-of-the-art and a future video coding standard.

The present embodiments generally relate to a method and an encoder for encoding a picture of a video sequence in a bitstream.

Figure 1:
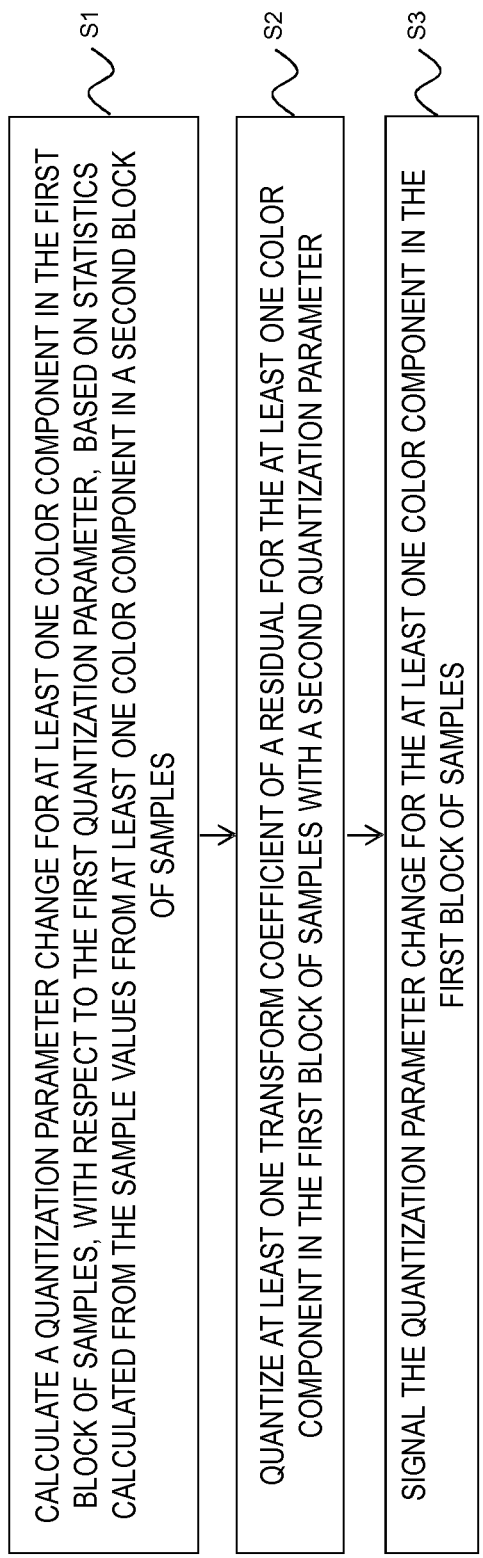
FIG. 1 illustrates a flowchart of a method of encoding a picture of a video sequence, according to embodiments of the present invention.

According to one aspect, a method for encoding a picture of a video sequence in a video bitstream is provided, as shown in FIG. 1. The picture comprises a first block of samples, wherein each sample in the first block of samples has sample values associated with at least a luma color component and a chroma color component. Each color component is assigned a first quantization parameter. The first quantization parameter may be a "default" quantization parameter, i.e. the quantization parameter according to an HEVC specification or obtained according to a state-of-the-art technique. Thus, the first quantization parameter corresponds to an initial QP value assigned to a color component.

Figure 2:
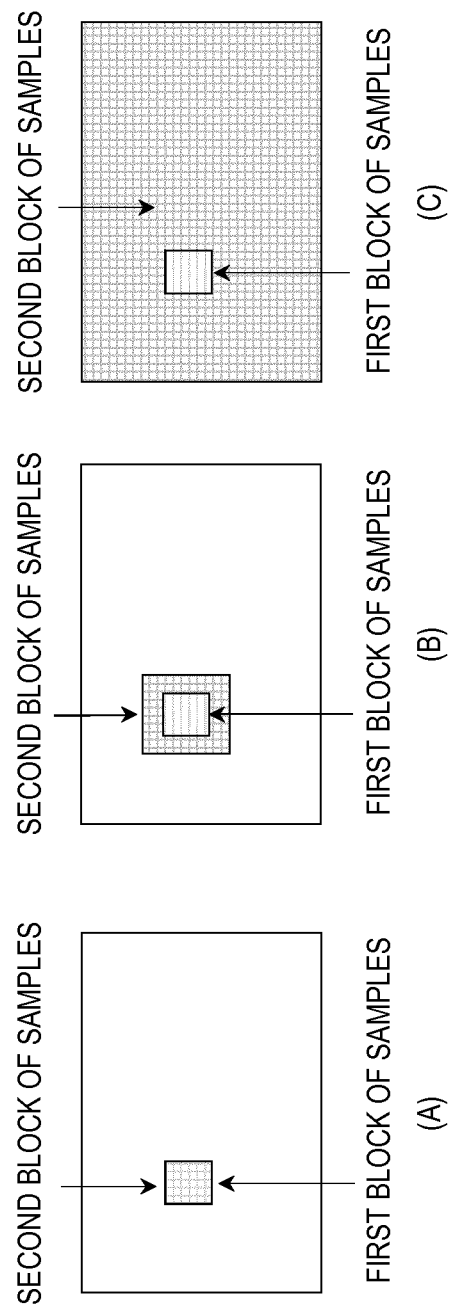
FIGS. 2 (A)-(C) illustrate examples for the first and second blocks of samples, according to embodiments of the present invention.

The method comprises a step S1 of calculating a quantization parameter change for at least one color component in the first block of samples, with respect to the first quantization parameter, based on statistics calculated from the sample values from at least one color component in a second block of samples. The second block of samples is one of: source samples of the first block of samples and source samples larger than the first block of samples including the first block of samples. Some examples for the first and second blocks of samples are shown in FIG. 2: example (a) where the second block of samples is identical to the first block of samples, example (b) where the second block of samples is larger than the first block of samples and it includes the first block of samples and example (c) where the second block of samples is an entire picture.

The statistics, used for calculating the quantization parameter for the at least one color component in the first block of samples, may be based on at least one of: average, median, minimum, maximum, quantile of source sample values, closeness of the source samples values of the first block to a color gamut edge, range and distribution of the sample values of the luma color component, size of the first block of samples and position of the first block of samples in the coding hierarchy.

According to a first embodiment of the present invention, the quantization parameter change for the at least one color component in the first block of samples is proportional to the average of sample values from at least the same color component in the second block of samples. For example, the quantization parameter change for the luma color component in the first block of samples may be proportional to the average of sample values from the luma color component in the second block of samples, where the second block of samples may be a tile, a slice or even an entire picture. When the average of sample values from the luma color component in the second block of samples is low, for example a value corresponding to a luminance below 100 NITS, a small amount of local changes of the quantization parameter may be allowed. If the average of sample values from the luma color component in the second block of samples is high, for example a value corresponding to a luminance above 100 NITS, a large amount of local changes of the quantization parameter may be allowed.

Suppose that the first quantization parameter is initially set to a default quantization parameter, for example as in a standard specification. The first quantization parameter may be a slice or a block QP. In case of low local luma level (or large variation in local luma level), the quantization parameter is set to be −1 compared to the default QP. Thus, the quantization parameter change is equal to −1 and the second quantization parameter is equal to the first quantization parameter minus one. By choosing this second QP value, one may avoid introducing artifacts in areas of low luma levels that are not masked by a picture/slice/tile that in general is bright. On the other hand, the quantization parameter may be set to +1 compared to the default QP value if the second block of samples (e.g., picture/slice/tile) has a high average luma level. That is, the quantization parameter change is equal to +1 and the second quantization parameter is equal to the first quantization parameter plus one. This can reduce the amount of bits spent for areas that are masked by a picture/slice/tile that in general is bright.

In HEVC v1 the quantization parameter can be controlled on a block level by deltaQP (cu_qp_delta_abs and cu_qp_delta_sign_flag). This adjusts the quantization parameter both for luma and chroma. In HEVC v2 the quantization parameter can also be controlled individually for the chroma components on a block level by (cu_chroma_qp_offset_flag and cu_chroma_qp_offset_idx).

According to another aspect of this embodiment, the quantization parameter change for the chroma color component in the first block of samples may be proportional to the average of sample values from any of the: luma color component, (same) chroma color component or both luma and (same) chroma color component in the second block of samples.

The quantization parameter change may, according to this embodiment, be adapted for at least one chroma color component according to the average luma level of the second block of samples (e.g., picture, slice or block or region). The quantization parameter change may be different for the Cb and Cr color components. The average is computed for the same region as the chroma quantization is changed for. Namely, if the quantization is adapted on the picture level (i.e. the second block of samples corresponds to an entire picture), then the average is computed for the entire picture etc. The chroma quantization parameter change is chosen such that the fidelity of the chroma color component sample values is increased if the average luma level is high, which happens e.g. when errors in chrominance can more easily be seen. On the other hand, the chroma quantization parameter change is chosen such that the fidelity of the chroma color component sample values is decreased when the average luma level is low, e.g. when errors in chrominance are not easy to discover.

One example corresponds to a case when the difference between the quantization parameters for the luma and chroma color components is larger when the average luma level for the second block of samples is high, compared to when the average luma level for the second block of samples is low. If the chroma quantization parameter is planned to be 30, (i.e. the first quantization parameter is equal to 30), but the average luma level for the second block of samples is low, the chroma quantization parameter is increased to 31 (i.e., the quantization parameter change for the chroma color component is equal to 1) in order to make color artifacts less visible in dark areas. On the other hand, if the average luma level for the second block of samples is high, it is easier to distinguish color artifacts and thus the chroma quantization parameter is reduced to 29, i.e., the quantization parameter change for the chroma color component is equal to −1.

The adjusted chroma quantization parameter can, in HEVC v1, be signaled in PPS (pps_cb_qp_offset, pps_cr qp_offset) or slice header (slice_cb_qp_offset, slice_crqp_offset). In HEVC v2 the adjusted chromea quantization parameter can be signaled on the block level by the delta QP (cu_chroma_qp_offset_flag and cu_chroma_qp_offset_idx).

Another alternative is to determine the quantization parameter change for the chroma component based on the average chroma of the second block of samples (picture, slice, block or region). The chroma quantization parameter change is chosen such that the fidelity of the chroma sample values is increased when the average chroma level is small, e.g. when chroma transform coefficients are likely to be removed otherwise, or decreased when the average chroma level is high.

Yet another alternative is to determine the quantization parameter change for the chroma component based on both chroma and luma component sample values. As an example, if the source sample values are very close to white or light-gray, then there may be a risk of chrominance artifacts unless the chroma color component is very well preserved. In this situation, the encoder may encode the first block of samples using a lower (second) chroma QP parameter (i.e. the quantization parameter change is negative), which results in better preserving the chroma and avoiding the chrominance artifacts in the current (first) block of samples.

Alternatively, it may be possible to look at the RGB representation of the source sample values to be encoded, the R'G'B' representation or the chrominance coordinates (x,y) or u'v' where u'=4x/(−2x+12y+3) and v'=9y/(−2x+12y+3)). It may be beneficial to decrease or increase the chroma QP or luma QP, with respect to the first chroma and luma QP values, either when one of these representations indicates that the chrominance is dose to the white point, or when it indicates that the chrominance is close to the gamut edge.

In another version of the embodiment the quantization parameter change for the luma color component (delta luma QP) can be chosen such that the slice QP comes close to the average QP of the slice. This may also be advantageous for the chroma QP since it is derived from the luma slice QP in HEVC v1.

Say, for instance, that the delta luma QP delta is adjusted on a block level according to the luma value of the block such that the delta luma QP takes on a value in the range [−6, . . . , 3], where a smaller delta luma QP is selected if the luma is high and a larger delta luma QP is selected if the luma is low. Since the chroma QP may only be adjusted on picture or slice level in HEVC v1, the chroma QP adjustment is based on the luma slice QP, which is equivalent to luma delta QP=0 in the range above. For a bright picture, the average delta luma QP will be far below 0. It may then be suboptimal to derive the chroma QP change from a luma slice QP that is far from the average luma QP. By instead shifting the range such that the slice QP comes closer to the average luma QP, e.g. [−2, . . . , 7], the chroma QP adjustments may be set to better match the scene of the picture.

According to a second embodiment of the present invention, the quantization parameter change for the at least one color component in the first block of samples is further proportional to a variation of sample values in the luma color component in the second block of samples or equivalently, the quantization parameter change for the at least one color component in the first block of samples is further proportional to a smoothness of the second block of samples. In this embodiment, in order to avoid chrominance artifacts in relatively smooth areas the QP change for a low luma level area is smaller compared to the QP change for an area with highly varying luma levels. Similarly, the decrease of QP (finer quantization) for a high luma level area is smaller for an area with highly varying luma level than for a smooth area. One way of implementing this is to define a 2D lookup table where the average luma level is in one dimension and the luma variation is in another dimension. Then, based on the 2D look up table the QP change is obtained. In version 1 of HEVC the only way to locally increase or decrease the QP is to do it for both luma and chroma using delta QP (cu_qp_delta_abs and cu_qp_delta_sign_flag). In version 2 of HEVC it is also possible to do it individually for the chroma components (cu_chroma_qp_offset_flag and cu_chroma_qp_offset_idx).

According to a third embodiment, the quantization parameter change for the chroma color component and, accordingly, the second (adjusted) chroma quantization parameter, depends on how close the chroma color component sample values in a block (RBG or YUV) are to the color gamut edge. Sample values closer to the color gamut are given a lower QP (finer quantization) than samples further away from the color gamut edge. Accordingly, the quantization parameter change is lower for the sample values closer to the color gamut edge than for the sample values further away from the color gamut edge. The QP parameter change may also be different for lower bitrates than for higher bitrates.

According to a fourth embodiment of the present invention, the quantization parameter change for the luma color component and, accordingly, the second quantization parameter for the luma color component, are calculated based on the range and distribution of the luma sample values. In a picture that contains only dark sample values, a smaller quantization parameter change may be used since there are no bright sample values for which the bits may be allocated instead. The distribution of the luma sample values may also be considered. If a picture has many more bright sample values than dark ones, a higher quantization parameter should be used for the dark regions since fine details in that area will be masked by the bright areas to a higher degree than if the luminance was more evenly spread out across the picture. For example, the QP change for the luma color component may be +3 for low luma levels and −6 for higher luma levels, that is chosen according to the specific distribution of luma samples in current slice/picture. A range of luma samples with the same QP adjustment that contains a peak in the distribution can be given a lower luma QP than it would have been given otherwise. Peaks at range with higher luma levels should typically be given a lower QP than peaks at lower luma levels.

Another approach is to determine the range of luma samples with the same QP adjustment determined from the distribution of the luma sample values. One strategy is to at least have the same QP adjustment around a peak in the distribution. If the distribution of luma samples contains four peaks, one could use a specific QP adjustment for each peak. A narrow peak in the distribution typically corresponds to relatively flat area that visually is important to keep accurate. Peaks at higher luma level should typically be given a lower QP than peaks at lower luminance levels. Peaks at lower luminance level can be more important, deserve a lower QP, than the QP for flat parts at lower luma levels.

According to a fifth embodiment, the quantization parameter change, which is based on the average sample value in the luma color component or is calculated according to any of the embodiments above, further depends on which layer belongs to or on what a picture type is. For instance, a picture in layer 0 may have a steeper function/mapping for adjusting QP (or, equivalently, calculating the QP change) based on luminance than a picture belonging to layer 1. In another example, the function/mapping for adjusting QP/calculating the QP change is different for intra, inter and/or bi-directional pictures.

According to a sixth embodiment of the present invention, the calculated quantization parameter change is based on frequency position of a transform coefficient and the second quantization parameter is a scaling factor for the transform coefficient In this embodiment the quantization scaling matrices for chroma are set such that the DC components will get (significantly) higher precision than the AC components. The benefit of this is that chroma discoloring artefacts may be reduced without having to spend extra bits on the chroma details. In one version of this embodiment, the difference between the scaling value of the DC component and the scaling values of the AC components in a quantization scaling matrix depends on the average luminance sample value of the second block of samples, i.e. scene/picture/slice or tile. It can also depend on the bitrate, e.g. so that it is especially used at low bitrates (high QP).

A variant of this may be to set the quantization matrices for the chroma color component such that the four lowest frequency transform coefficients (DC and plane) get (significantly) higher precision than higher frequency transform coefficients. This can enable visible pleasing representation smooth chroma areas. For transform sizes larger than 8×8 in HEVC, i.e. 16×16 and 32×32, the scaling factor is shared between 2×2 and 4×4 blocks respectively. Thus, in order to set the plane transform coefficients in a 32×32 transform such that they will have higher precision than the AC coefficients with higher frequencies, all 4×4 (minus the DC component) AC transform coefficients with the lowest frequencies must be given the same scaling factor.

The same approach may be applied for larger transform block sizes (above 16×16) that are typically used to encode smooth regions. It can also be such that the quantization strategy is more aggressive (larger difference in quantization for low and high frequencies) for large transform block size than for smaller transform block sizes. The quantization strategy may also depend on the bitrate, so that low bitrates (high QP) are quantized more aggressively that at higher rates (low QP).

This embodiment may as well be applied on the luma color component.

According to a seventh embodiment, the quantization parameter change depends on a block size of the second block of samples. A large block size is selected when there is typically little to encode. It is especially favorable to select a large block size if the texture to encode is smooth. However, when large block sizes are used for smooth structures using a relatively high QP, one can more easily get boundary artifacts that are difficult to remove by in-loop filtering. Therefore, it may be good to use a relatively lower QP (finer quantization) for large blocks than the QP for small blocks. Block size typically refers to transform block size but if the maximum transform block size is used and it is smaller than the prediction block size, it can relate to the prediction block size.

As an example, consider that the transform block size is the same as the maximum possible size allowed in HEVC, i.e., 32×32, and the prediction block size is 64×64. Then, the first QP is reduced by 2, giving a finer quantization. If the transform block size is 32×32 and this is the same or larger than the prediction block size, the first QP is reduced by 1, i.e. the quantization parameter change is equal to −1. Finally, if the transform block size is 16×16 or smaller than that, the first QP is kept unmodified.

Another variant is to reduce the first QP by 2 when the transform block size is 32×32 and the prediction block size is 64×64, to reduce it by 1 when the transform block size is 32×32 and the prediction block size is 32×32, not to reduce it when the transform block size is 16×16, to increase it by 1 when the transform block size is 8×8 and to increase it by 2 when the transform block size is 4×4.

Yet another variant is to define the scaling matrices such that larger transform blocks are set to use a scaling matrix that corresponds to finer quantization than the scaling matrix used for smaller transform blocks. One example of setting is to define the scaling matrix with all values set to 8, corresponding to finer quantization than given by block QP, for a luma 32×32 transform and a chroma 16×16 transform, then set all values to 12, corresponding to a medium finer quantization, for a luma 16×16 transform and a chroma 8×8 transform and finally for smaller transforms set all values to 16 corresponding to no modification of the quantization compared to the block QP.

The scaling can be done more aggressively, e.g. larger difference in scaling matrix values for large and small transforms if the bitrate is low/high average QP than when bitrate is higher/low average QP is used. The scaling for large and small transforms can also be more aggressive when the average luma level is low compared to when it's high. The scaling can be even more aggressive for chroma than luma when the average luma level is low since human perception of color is weak for low luminance and thus can more bits be spent on luma than chroma.

The scaling may also be done by taking into account that low frequency coefficients are more important than high frequency coefficients and that the steepness of the slope from low to high frequency coefficients follows similar trend as described above, so that it is steeper for lower bitrates than higher bitrates, steeper for low luma levels than high luma levels and steeper for chroma than luma for low luma levels than high luma levels.

Depending on where coding artifacts are most prominent, one can set the scaling matrices corresponding to finer quantization for intra than inter coded blocks of samples.

The method further comprises a step S2 of quantizing at least one transform coefficient of a residual for the at least one color component in the first block of samples with the second quantization parameter. As already described above, the second quantization parameter is equal to the sum of the first quantization parameter and the quantization parameter change for the at least one color component.

The method further comprises a step S3 of signaling the quantization parameter change for the at least one color component to a decoder. The quantization parameter change may be signaled in a picture parameter set, slice header or on a block of samples.

FIG. 3 is a schematic block diagram of an encoder 100 for encoding a picture of a video sequence in a video bitstream. The picture comprises a first block of samples, wherein each sample in the first block of samples has sample values associated with at least a luma color component and a chroma color component. Each color component is assigned a first quantization parameter. The encoder comprises a calculating unit 160, configured to calculate a quantization parameter change for at least one color component in the first block of samples, with respect to the first quantization parameter, based on statistics calculated from the sample values from at least one color component in a second block of samples. The second block of samples is one of: source samples of the first block of samples and source samples larger than the first block of samples including the first block of samples. The encoder comprises a quantizing unit 170, configured to quantize at least one transform coefficient of a residual for the at least one color component in the first block of samples with a second quantization parameter, wherein the second quantization parameter is equal to the sum of the first quantization parameter and the quantization parameter change for the at least one color component. The encoder comprises a signaling unit 180, configured to signal the quantization parameter change for the at least one color component to a decoder, as shown in FIG. 4.

The calculating 160, quantizing 170 and signaling 180 units may be hardware based, software based (in this case they are called calculating, quantizing and sending modules respectively) or may be a combination of hardware and software.

The encoder 100 may be an HEVC encoder or any other state of the art or future video encoder.

The calculating unit 160 may calculate a quantization parameter for at least one color component in the first block of samples based on statistics calculated from the sample values from at least one color component in the second block of samples. The second block of samples is one of: source samples of the first block of samples and source samples larger than the first block of samples including the first block of samples. The statistics may be based on at least one of: average, median, minimum, maximum, quantile of source sample values, closeness of the source samples values of the first block to a color gamut edge, range and distribution of the sample values of the luma color component, size of the first block of samples and position of the first block of samples in the coding hierarchy.

The calculating unit 160 may further calculate the quantization parameter change for the at least one color component in the first block of samples proportionally to the average of sample values from at least the same color component in the second block of samples. The calculating unit 160 may further take into account a variation of sample values in the luma color component in the second block of samples.

The calculating unit 160 may further calculate the quantization parameter change based on frequency position of a transform coefficient and wherein the second quantization parameter is a scaling factor for the transform coefficient.

The signaling unit 180 may signal the quantization parameter change in a picture parameter set (PPS), slice header or on a block of samples level.

The encoder 100 can be implemented in hardware, in software or a combination of hardware and software. The encoder 100 can be implemented in user equipment, such as a mobile telephone, tablet, desktop, netbook, multimedia player, video streaming server, set-top box or computer. The encoder 100 may also be implemented in a network device in the form of or connected to a network node, such as radio base station, in a communication network or system.

Although the respective units disclosed in conjunction with FIG. 3 have been disclosed as physically separate units in the device, where all may be special purpose circuits, such as ASICs (Application Specific Integrated Circuits), alternative embodiments of the device are possible where some or all of the units are implemented as computer program modules running on a general purpose processor. Such an embodiment is disclosed in FIG. 5.

FIG. 5 schematically illustrates an embodiment of a computer 150 having a processing unit 110 such as a DSP (Digital Signal Processor) or CPU (Central Processing Unit). The processing unit 110 can be a single unit or a plurality of units for performing different steps of the method described herein. The computer also comprises an input/output (IO) unit 120 for receiving a video sequence. The I/O unit 120 has been illustrated as a single unit in FIG. 5 but can likewise be in the form of a separate input unit and a separate output unit.

Furthermore, the computer 150 comprises at least one computer program product 130 in the form of a non-volatile memory, for instance an EEPROM (Electrically Erasable Programmable Read-Only Memory), a flash memory or a disk drive. The computer program product 130 comprises a computer program 140, which comprises code means which, when run on the computer 150, such as by the processing unit 110, causes the computer 150 to perform the steps of the method described in the foregoing in connection with FIG. 1.

The embodiments described above are to be understood as a few illustrative examples of the present invention. It wig be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for encoding a picture of a video sequence in a video bitstream, the picture comprising a first block of samples, wherein each sample in the first block of samples has sample values associated with at least a luma color component and a chroma color component, and wherein each color component is assigned a first quantization parameter, the method comprising:

calculating a quantization parameter change for at least one color component in the first block of samples, with respect to the first quantization parameter, based on statistics calculated from sample values associated with at least one color component in a second block of samples, wherein the second block of samples is one of: source samples of the first block of samples and source samples larger than the first block of samples including the first block of samples;

quantizing at least one transform coefficient of a residual for the at least one color component in the first block of samples with a second quantization parameter, wherein the second quantization parameter is equal to the sum of the first quantization parameter and the quantization parameter change for the at least one color component in the first block of samples; and signaling the quantization parameter change for the at least one color component in the first block of samples to a decoder, wherein calculating the quantization parameter change is further based on frequency position of a transform coefficient and wherein the second quantization parameter is a scaling factor for the transform coefficient, and wherein lowest frequency transform coefficients are getting higher precision than higher frequency transform coefficients by setting quantization scaling matrices for at least one color component using a variant between scaling values of DC components and scaling values of AC components in the quantization scaling matrices.

2. The method of claim 1, wherein the quantization parameter change is signaled in a picture parameter set (PPS), slice header, or on a block of samples level.

3. The method of claim 1, wherein the statistics is based on at least one of one of:

average, median, minimum, maximum, quantile of source sample values, closeness of the source samples values of the first block to a color gamut edge, range and distribution of the sample values of the luma color component, size of the first block of samples and position of the first block of samples in the coding hierarchy.

4. The method of claim 1, wherein the quantization parameter change for the at least one color component in the first block of samples is proportional to the average of sample values associated with at least the same color component in the second block of samples.

5. The method of claim 1, wherein the quantization parameter change for the at least one color component in the first block of samples is proportional to a variation of sample values associated with a luma color component in the second block of samples.

6. The method of claim 1, wherein
the quantization parameter change for said at least one color component in the first block of samples is the quantization parameter change for the chroma color component in the first block of samples, and
the quantization parameter change is calculated based on any one or combination of (1) an average of sample values associated with a chroma color component in the second block of samples and (2) an average of sample values associated with a luma color component in the second block of samples.

7. The method of claim 1, wherein
the quantization parameter change for said at least one color component in the first block of samples is the quantization parameter change for the chroma color component in the first block of samples, and
the quantization parameter change is calculated based on a variation of sample values associated with a luma color component in the second block of samples.

8. The method of claim 1, wherein
the quantization parameter change for said at least one color component in the first block of samples is the quantization parameter change for the luma color component in the first block of samples, and
the quantization parameter change is calculated based on a range and/or a distribution of sample values associated with a luma color component in the second block of samples.

9. An encoder, for encoding a picture of a video sequence in a video bitstream, the picture comprising a first block of samples, wherein each sample in the first block of samples has sample values associated with at least a luma color component and a chroma color component, and wherein each color component is assigned a first quantization parameter, the encoder being operative to:

calculate a quantization parameter change for at least one color component in the first block of samples, with respect to the first quantization parameter, based on statistics calculated from sample values associated with at least one color component in a second block of samples, wherein the second block of samples is one of: source samples of the first block of samples and source samples larger than the first block of samples including the first block of samples;

quantize at least one transform coefficient of a residual for the at least one color component in the first block of samples with a second quantization parameter, wherein the second quantization parameter is equal to the sum of the first quantization parameter and the quantization parameter change for the at least one color component in the first block of samples; and signal the quantization parameter change for the at least one color component in the first block of samples to a decoder, wherein the calculated quantization parameter change is further based on frequency position of a transform coefficient and wherein the second quantization parameter is a scaling factor for the transform coefficient, and wherein lowest frequency transform coefficients are getting higher precision than higher frequency transform coefficients by setting quantization scaling matrices for at least one color component using a variant between scaling values of DC components and scaling values of AC components in the quantization scaling matrices.

10. The encoder of claim 9, wherein the quantization parameter change is signaled in a picture parameter set (PPS), slice header, or on a block of samples level.

11. The encoder of claim 9, wherein the statistics is based on at least one of one of:
average, median, minimum, maximum, quantile of source sample values, closeness of the source samples values of the first block to a color gamut edge, range and distribution of the sample values of the luma color component, size of the first block of samples and position of the first block of samples in the coding hierarchy.

12. The encoder of claim 9, wherein the quantization parameter change for the at least one color component in the first block of samples is proportional to the average of sample values associated with at least the same color component in the second block of samples.

13. The encoder of claim 9, wherein the quantization parameter change for the at least one color component in the first block of samples is proportional to a variation of sample values associated with a luma color component in the second block of samples.

14. The encoder of claim 9, wherein
the encoder comprises a processor and a memory wherein said memory is containing instructions executable by said processor.

15. The encoder of claim 9, wherein
the quantization parameter change for said at least one color component in the first block of samples is the quantization parameter change for the chroma color component in the first block of samples, and
the quantization parameter change is calculated based on any one or combination of (1) an average of sample values associated with a chroma color component in the second block of samples and (2) an average of sample values associated with a luma color component in the second block of samples.

16. The encoder of claim 9, wherein
the quantization parameter change for said at least one color component in the first block of samples is the quantization parameter change for the chroma color component in the first block of samples, and
the quantization parameter change is calculated based on a variation of sample values associated with a luma color component in the second block of samples.

17. The encoder of claim 9, wherein
the quantization parameter change for said at least one color component in the first block of samples is the quantization parameter change for the luma color component in the first block of samples, and
the quantization parameter change is calculated based on a range and/or a distribution of sample values associated with a luma color component in the second block of samples.

18. A computer program product comprising a non-transitory computer readable medium storing a computer program, for encoding a picture of a video sequence in a video bitstream, the picture comprising a first block of samples, wherein each sample in the first block of samples has sample values associated with at least a luma color component and a chroma color component, the computer program comprising instructions which, when run on a computer, causes the computer to:
calculate a quantization parameter change for at least one color component in the first block of samples, with respect to the first quantization parameter, based on statistics calculated from sample values associated with at least one color component in a second block of samples, wherein the second block of samples is one of: source samples of the first block of samples and source samples larger than the first block of samples including the first block of samples;

quantize at least one transform coefficient of a residual for the at least one color component in the first block of samples with a second quantization parameter, wherein the second quantization parameter is equal to the sum of the first quantization parameter and the quantization parameter change for the at least one color component in the first block of samples; and signal the quantization parameter change for the at least one color component in the first block of samples to a decoder, wherein the calculated quantization parameter change is further based on frequency position of a transform coefficient and wherein the second quantization parameter is a scaling factor for the transform coefficient, and wherein lowest frequency transform coefficients are getting higher precision than higher frequency transform coefficients by setting quantization scaling matrices for at least one color component using a variant between scaling values of DC components and scaling values of AC components in the quantization scaling matrices.

* * * * *